United States Patent [19]

Noguchi et al.

[11] Patent Number: 4,942,487
[45] Date of Patent: Jul. 17, 1990

[54] APPARATUS FOR RECORDING/REPRODUCING A DIGITAL SIGNAL AT VARIABLE SPEEDS

[75] Inventors: Takaharu Noguchi; Takao Arai, both of Yokohama, Japan

[73] Assignee: Hitachi, Ltd., Tokyo, Japan

[21] Appl. No.: 157,795

[22] Filed: Feb. 19, 1988

[30] Foreign Application Priority Data

Mar. 13, 1987 [JP] Japan .................................. 62-56768

[51] Int. Cl.$^5$ .......................................... G11B 15/473
[52] U.S. Cl. .................................. 360/77.13; 360/70; 360/73.05; 360/75
[58] Field of Search ................................. 360/9.1–10.3, 360/32, 70, 73.05, 73.09, 75, 77.13–77.15

[56] References Cited

U.S. PATENT DOCUMENTS 4,484,236 11/1984 Wilkinson ......................... 360/10.3

FOREIGN PATENT DOCUMENTS 59-213005 12/1984 Japan .
60-089861 5/1985 Japan .
60-223075 11/1985 Japan .
61-139906 6/1986 Japan .
61-296556 12/1986 Japan .

*Primary Examiner*—Aristotelis M. Psitos
*Assistant Examiner*—David L. Robertson
*Attorney, Agent, or Firm*—Antonelli, Terry, Stout & Kraus

[57] ABSTRACT

A digital signal recording/reproducing apparatus for enabling recording/reproduction at variable speeds including normal speed, and at least one of N-times normal speed and 1/N-times normal speed while maintaining the reproducing frequency constant so as to not require switching of analog circuits. At the time of reproduction at normal speed, N-times normal speed or 1/N-times normal speed, the feed speed of the magnetic tape and the timing of picking up of a reproducing signal from the magnetic tape are varied while the speed of revolution of a cylinder of a rotary head is maintained constant so that the timing of detection of pilot signals for generating a tracking error signal is varied to cope with difference in track scanning conditions in recording and reproducing modes.

3 Claims, 14 Drawing Sheets

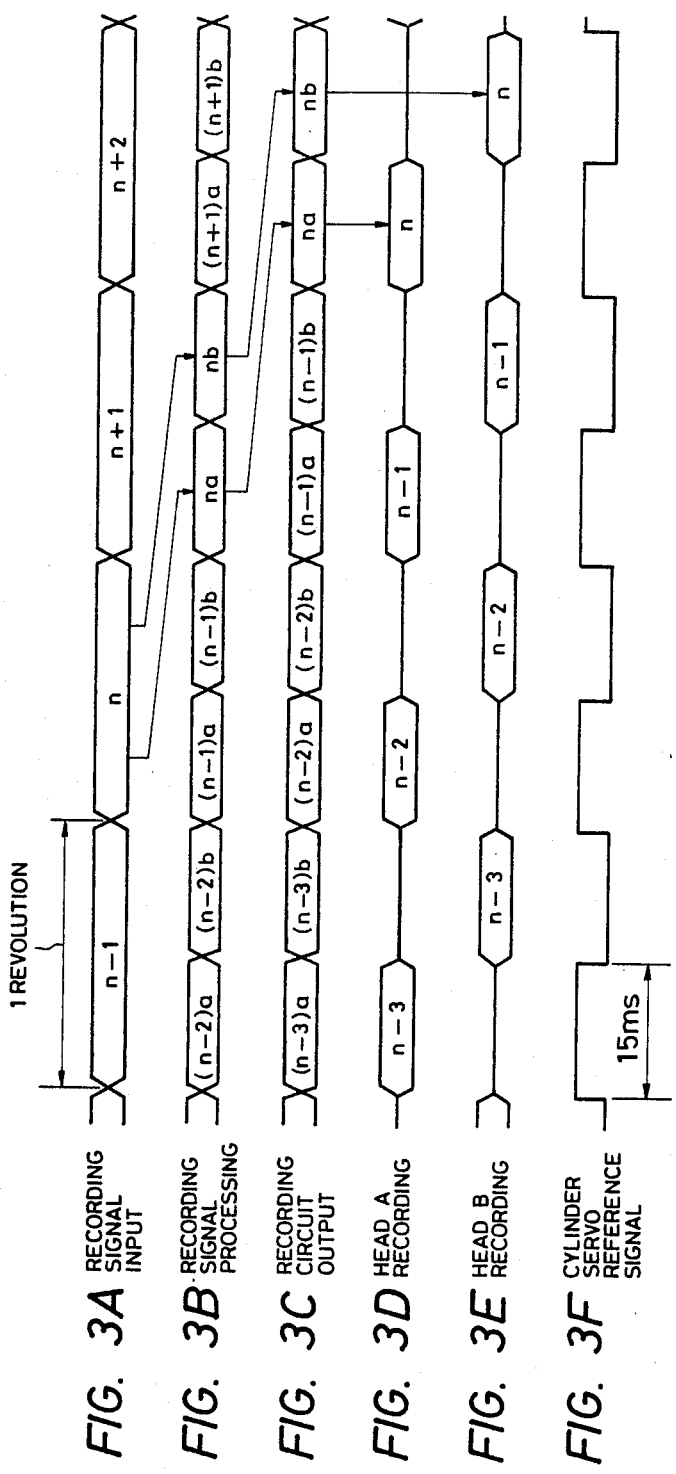

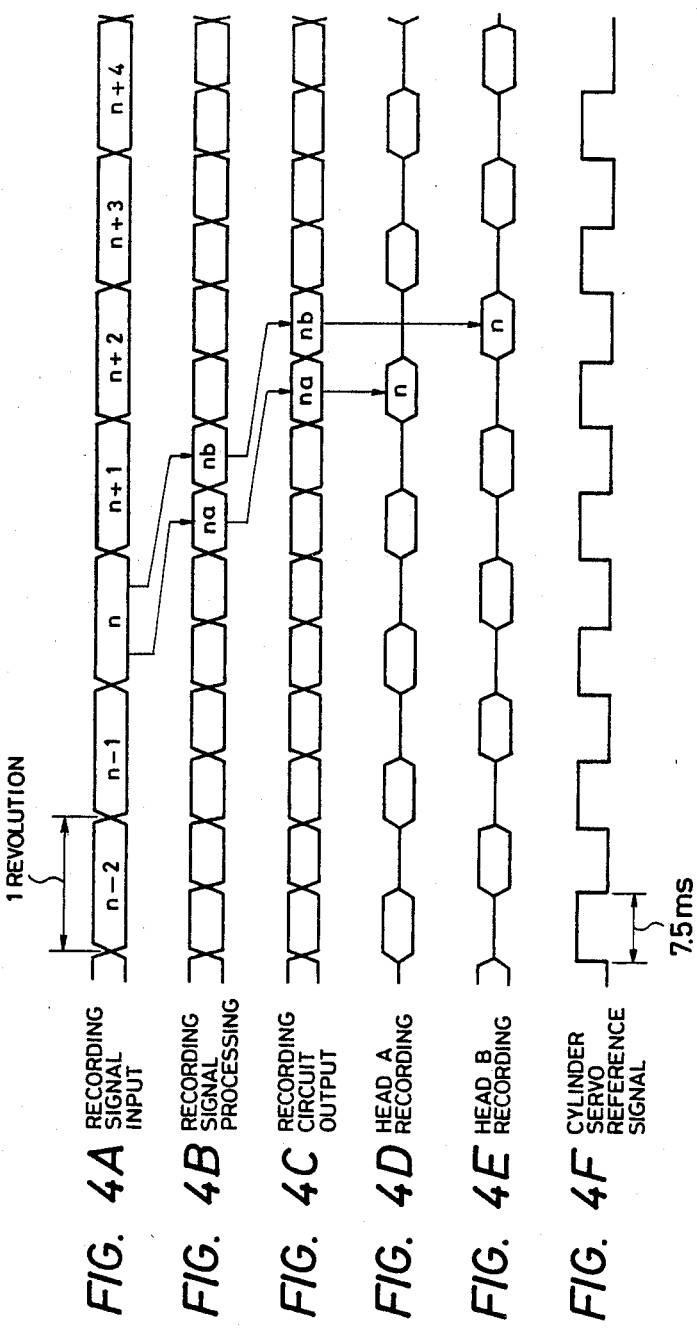

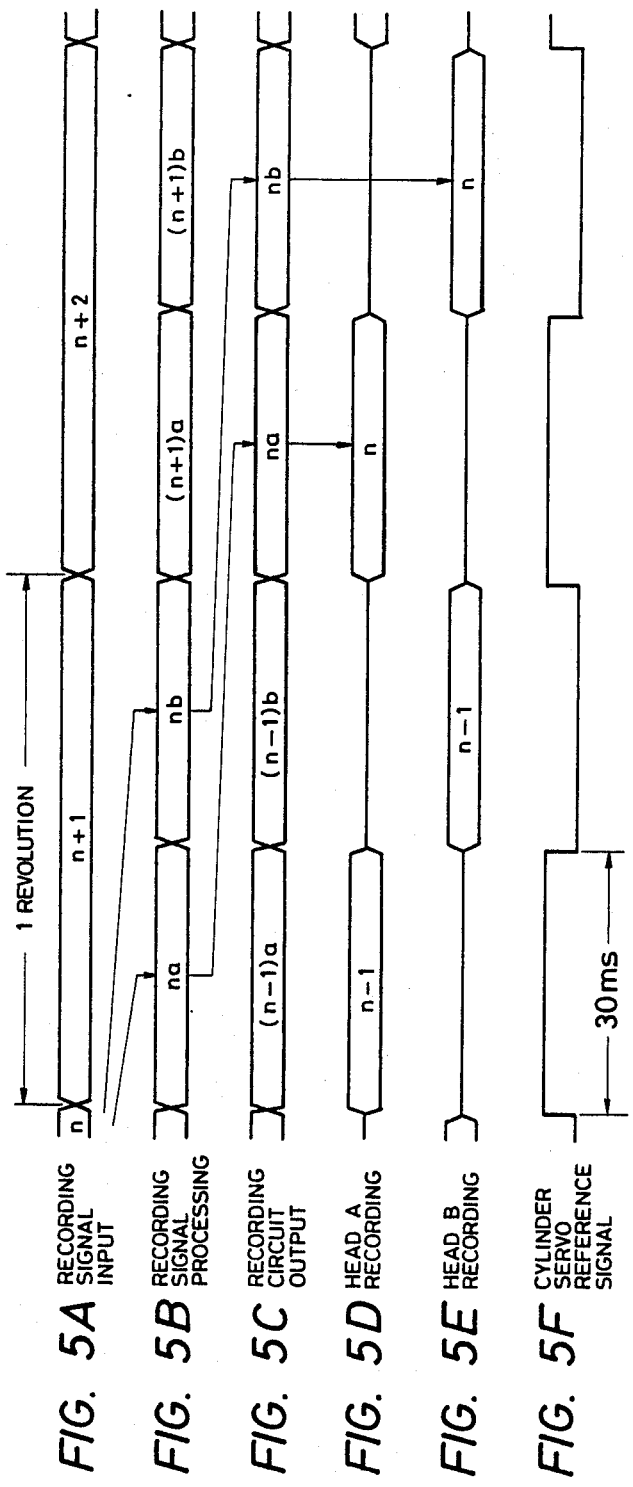
FIG. 5A RECORDING SIGNAL INPUT
FIG. 5B RECORDING SIGNAL PROCESSING
FIG. 5C RECORDING CIRCUIT OUTPUT
FIG. 5D HEAD A RECORDING
FIG. 5E HEAD B RECORDING
FIG. 5F CYLINDER SERVO REFERENCE SIGNAL

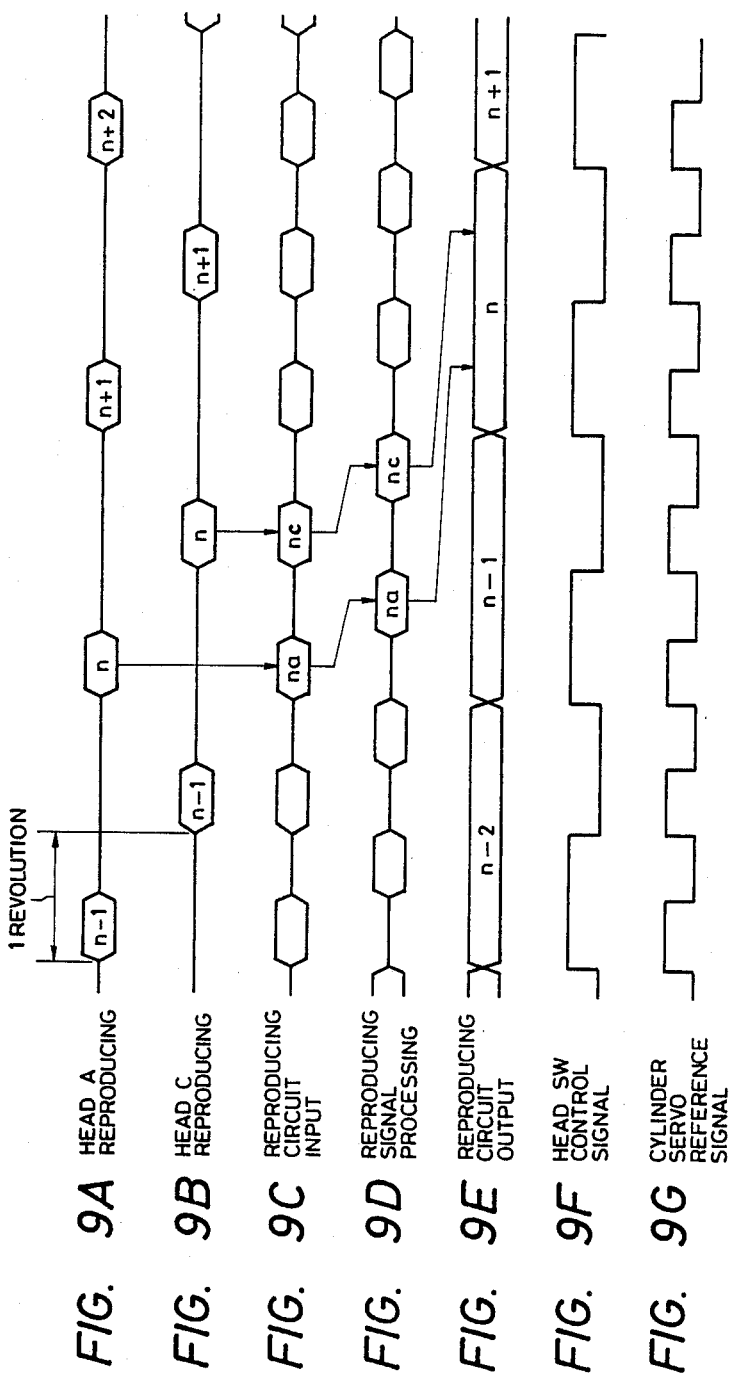

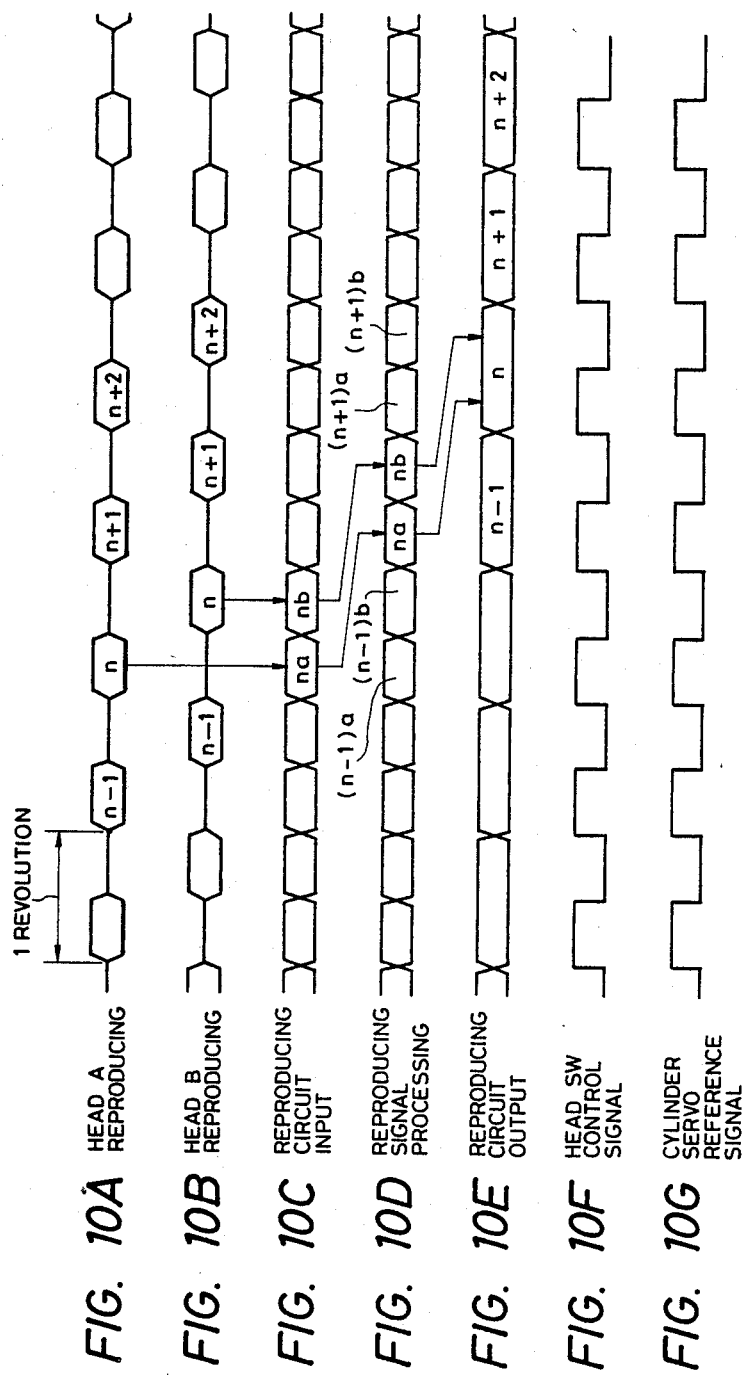

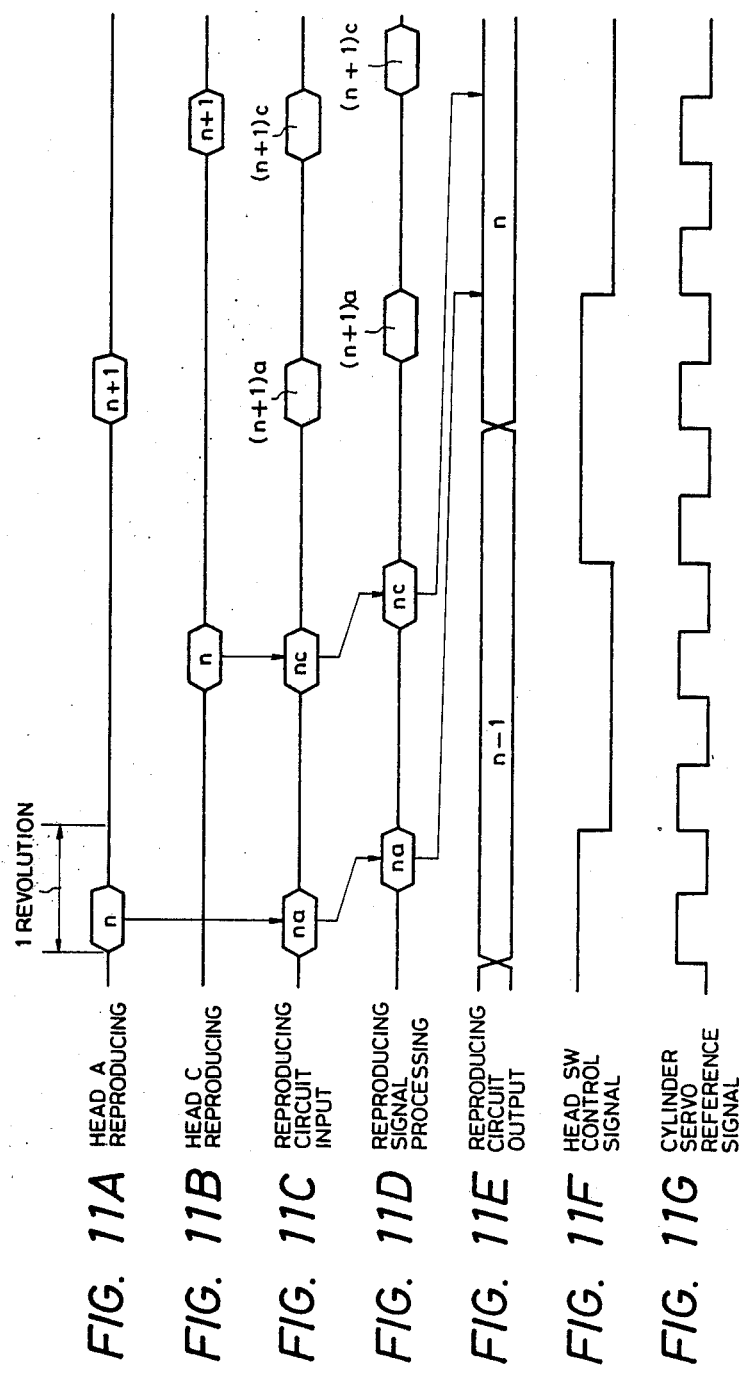

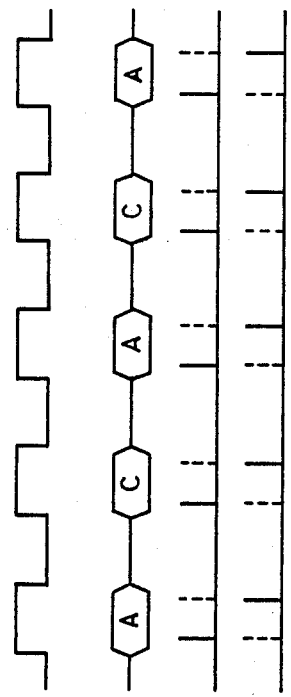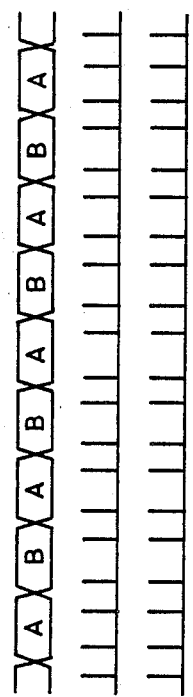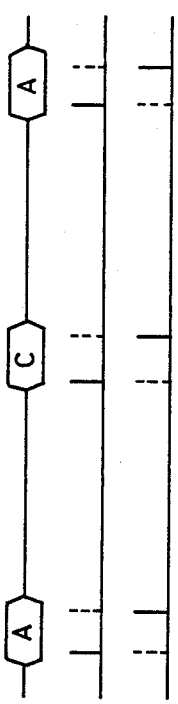
FIG. 16A(1) CYLINDER REF. SIGNAL
FIG. 16A(2) REPRO. AMP. INPUT
FIG. 16A(3) SP 1
FIG. 16A(4) SP 2
FIG. 16B(1) REPRO. AMP. INPUT
FIG. 16B(2) SP 1
FIG. 16B(3) SP 2
FIG. 16C(1) REPRO. AMP. INPUT
FIG. 16C(2) SP1
FIG. 16C(3) SP2

APPARATUS FOR RECORDING/REPRODUCING A DIGITAL SIGNAL AT VARIABLE SPEEDS

BACKGROUND OF THE INVENTION

The present invention relates to a digital signal recording/reproducing apparatus of the rotary head type and more particularly to a digital signal recording/reproducing apparatus suitable for variable-speed recording/reproduction.

As an apparatus using a rotary head formed of a cylinder with magnetic heads mounted thereon for recording/reproducing a digital signal on a magnetic tape, there is a PCM recorder, for example, as disclosed in U.S. Pat. No. 4,227,221. By such a system using a rotary head, improvement in signal recording density is achieved and also a reproducing signal with high quality can be obtained.

The present applicant has already made a number of patent applications for the inventions relative to the PCM recorder and been granted U.S. Pat. Nos. 4,309,726, 4,617,599, 4,677,622, 4,649,542, 4,594,621, 4,646,301, 4,704,640, 4,646,170, 4,660,200, etc.

Functions of such a PCM recorder include long-time recording/reproduction performed by its operation at 1/N-times normal speed and high-speed dubbing performed by its recording/reproduction of a signal at N-times normal speed. These functions are produced by an arrangement so that the number of revolutions of the cylinder, i.e., that of the rotary head, and the feed speed of the tape are simultaneously changed so that recording/reproducing at, for example, half speed (1/N-times normal speed where N=2) or double speed (N-times normal speed where N=2) are performed.

In the above mentioned prior art, the number of revolutions of the cylinder, i.e., of the rotary head, is changed in the reproduction mode at N-times normal speed or 1/N-times normal speed, and as a result, the frequency of the signal reproduced by the rotary head is subjected to variation. Hence, there was such a problem that the signal frequency was lowered in the mode at low-speed (for example, at ½-times normal speed=half speed), and therefore, the head sensitivity was lowered and the S/N ratio deteriorated. Further, because the reproducing frequency from the rotary head was varied depending upon the modes of operation, there also was such a problem that it was required to switch analog circuits such as equalizers, frequencies of a VCO of a data strobing circuit, or the like in order to achieve correct demodulation of the signal.

SUMMARY OF THE INVENTION

An object of the present invention is to provide a digital signal recording/reproducing apparatus enabled to perform the recording/reproduction at N-times normal speed or 1/N-times normal speed with the reproducing frequency kept constant and not requiring the switching of analog circuits.

The aforementioned object is achieved by controlling the apparatus such that, at the time of reproduction at normal speed, N-times normal speed, or 1/N-times normal speed, the feed speed of the magnetic tape and the timing of picking up the reproducing signal are varied, while the number of revolutions of the cylinder, i.e., the number of revolutions of the rotary head is kept constant, and at the same time, coping with the difference in the track scanning conditions caused by the number of revolutions of the cylinder changing from that in the recording mode to that in the reproducing mode, the timing of detecting pilot signals for generating a tracking error signal is varied, so that optimal auto track finding control (hereinafter to be called ATF control) may be performed.

By the present invention, a digital signal recording/reproducing apparatus with excellent functions, performing the recording/reproduction at N-times normal speed or 1/N-times normal speed without changing the reproducing frequency and not requiring the switching of analog circuits, and thereby overcoming the aforementioned difficulties in the prior art, can be provided.

BRIEF DESCRIPTION OF THE DRAWINGS

FIGS. 3A-3F are operating timing charts at the time of recording at normal speed;

FIGS. 4A-4F are operating timing charts at the time of recording at double speed;

FIGS. 5A-5F are operating timing charts at the time of recording at half speed;

FIGS. 9A-9G are operating timing charts at the time of reproduction at normal speed;

FIGS. 10A-10G are operating timing charts at the time of reproduction at double speed;

FIGS. 11A-11G are operating timing charts at the time of reproduction at half speed;

FIGS. 16A, 16B, and 16C are output timing charts of signal SP1 and signal SP2 at the times of reproduction at normal speed, double speed, and half speed, respectively.

DESCRIPTION OF THE PREFERRED EMBODIMENT

Below will be given description of the main points of the present invention more concretely. That is, the feed speed control means of the magnetic tape, at the time of recording/reproduction at double or half the normal speed, for example, makes the tape feed speed double or half. And, the cylinder control means, at the time of recording at double speed or half speed, makes the number of revolutions of the cylinder double or half similarly to the feed speed control means, and further, responding to a control signal from a timing generator circuit, makes the frequency of the recording signal of the recording circuit double or half. And thereby, the recording pattern on the magnetic tape can be made invariable irrespective of the mode of recording at normal speed, double speed, or half speed.

At the time of reproduction, however, the cylinder control means keeps the number of revolutions of the cylinder constant, for example, at double the speed at the time of normal recording irrespective of the reproducing speed at normal speed, double speed, or half speed, and it is adapted, by means of the timing generator circuit, such that the picking up of the reproducing signal are performed at intervals of two track scans at the time of reproduction at normal speed, or of four track scans at the time of reproduction at half speed, by two heads switched to each other, the heads being provided with mutually different azimuth angles and disposed on the cylinder adjoining each other.

Further, since conditions of the head scanning on the record track at the time of reproduction at normal speed and half speed are different from those at the time of reproduction at double speed, the tracking control means switches the detecting timing of pilot signals for generating a track error signal. That is, at the time of reproduction at double speed when head scanning the same as that at the time of recording is performed, it detects the pilot signals on both adjoining tracks at each of first and second tracking control signal record areas disposed at the inlet portion and the outlet portion of each track and makes the ATF control by controlling the level difference to become zero.

However, at the time of reproduction at normal speed or half speed, it detects the pilot signal on one adjoining track at the first tracking control signal record area and the pilot signal on the other adjoining track, opposite to the aforesaid track, at the second tracking control signal record area, and thereby makes the control.

Thus, the recording/reproduction at N-times normal or 1/N-times normal speed, e.g., at half speed or double speed, can be achieved with the reproducing frequency kept constant, the S/N ratio not lowered, and the switching of the analog circuits not required.

An embodiment of the present invention will be described below with reference to the accompanying drawings.

Figure 1:
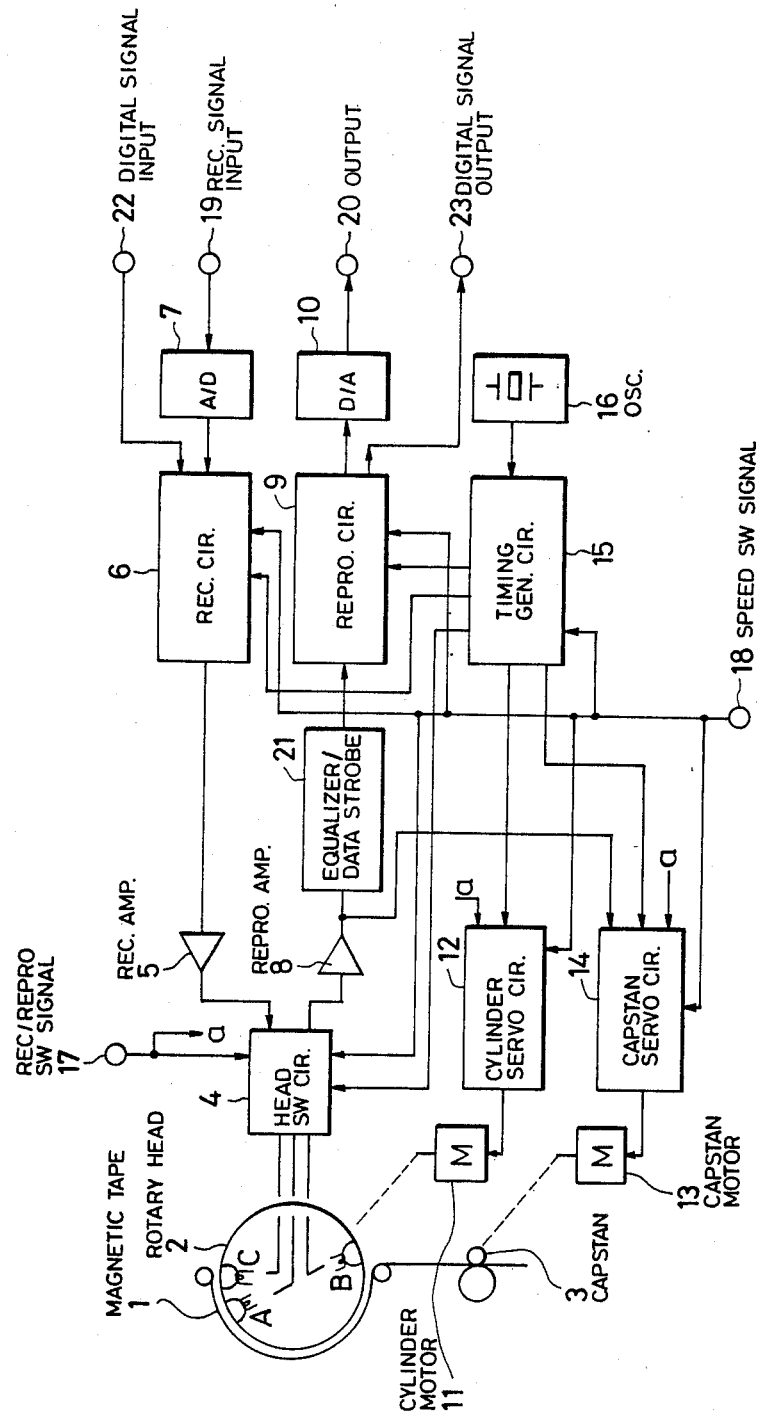
FIG. 1 is a block diagram showing an embodiment of the digital signal recording/reproducing apparatus of the present invention.

FIG. 1 is a block diagram showing an embodiment of the digital signal recording/reproducing apparatus, wherein reference numeral 1 denotes a magnetic tape, 2 denotes a rotary head, 3 denotes a capstan, 4 denotes a head switching circuit, 5 denotes a recording amplifier, 6 denotes a recording circuit, 7 denotes an A/D converter, 8 denotes a reproducing amplifier, 21 denotes an equalizer/data strobe, 9 denotes a reproducing circuit, 10 denotes a D/A converter, 11 denotes a cylinder motor for the rotary head, 12 denotes a cylinder servo circuit constituting cylinder control means, 13 denotes a capstan motor, 14 denotes a capstan servo circuit constituting magnetic tape feed speed control means, 15 denotes a timing generator circuit, and 16 denotes an oscillator.

The rotary head 2 is provided with three heads, namely, a first head (hereinafter to be referred to as head A), a second head (hereinafter to be referred to as head B), and a third head (hereinafter to be referred to as head C) disposed thereon. Head A and head C are disposed adjoining each other, of which head A is of (+) azimuth angle and head C is of (−) azimuth angle. As the heads A and C, those can also be used which are formed of two gaps made on the same head provided with different azimuth angles. Head B is disposed on the opposite side of the heads A and C with respect to the axis of the cylinder, virtually at an angle of 180° therewith, and is provided with (−) azimuth angle. These heads A, B, and C are connected with the head switching circuit 4 through a rotary transformer (not shown) for the cylinder.

The magnetic tape 1 is wrapped around the cylinder having a rotary head 2 thereon. In the case of FIG. 1, the wrap angle is made to be 180°, but of course the wrap angle may be of other angles. When the wrap angle is made to be 90°, the record pattern on the magnetic tape can be kept constant by varying the cylinder diameter in inverse proportion to the wrap angle. That is, when the wrap angle is changed from 90° to 180°, same result will be obtained by making the cylinder diameter half.

Now, operations of FIG. 1 will be described. First, the operation at the time of recording will be described. In the recording mode, heads A and B are used.

In the recording mode, a recording signal input from an input terminal 19 is converted into a PCM signal in the A/D converter 7. The input signal can of course be a digital signal, in which case, the A/D converter 7 is not necessary and the signal can be input directly from a digital signal input terminal 22. The PCM signal is input to the recording circuit 6 and processed therein so as to be provided with a synchronizing signal, error correction code, etc., and thereafter, sent to the recording amplifier 5 to be amplified to a predetermined level and then input to the switching circuit 4. The switching circuit 4, responding to a timing signal generated by the timing generator circuit 15, alternately supplies head A and head B with the recording signal. Thus, recording is made on the magnetic tape 1 by head A and head B.

The cylinder control means, constituted of the cylinder motor 11 and the cylinder servo circuit 12, and the magnetic tape feed sped control means, constituted of the capstan motor 13 and the capstan servo circuit 14, control the number of revolutions of the cylinder and the feed speed of the tape according to predetermined timing generated by the timing generator circuit 15.

For example, at the time of recording at double speed or half speed, they make the revolving speed of the cylinder and the tape feed speed double or half their respective normal speeds.

The recording circuit 6, based on the timing generated by the timing generator circuit 15 and according to the mode of operation whether at double speed or at half speed, makes double or half the signal processing speeds for adding the synchronizing signal, the error correction code, etc. to the signal and delivers the processed signal to the recording amplifier 5. Therefore, the frequency (transmission rate) of the signal input to the recording amplifier is doubled or halved at the time of operation at double speed or half speed.

Now, the operation at the time of reproduction will be described. The capstan servo circuit in the reproducing mode controls the revolution of the capstan motor 13, the same as in the recording mode, according to the mode of operation at double speed or half speed, whereby the tape feed speed is made double or half. On the other hand, the cylinder servo circuit provides the cylinder with a fixed number of revolutions, for example, the number of revolutions the same as that in the recording mode at double speed, irrespective of the mode or operation at double speed, half speed, or the like.

Thus, the frequency (transmission rate) of the signal read out from the rotary head is made constant.

In the reproducing mode, the reproducing signal reproduced by head A and head B, or head C, is alternately selected by the later discussed head switching circuit 4 and amplified to a predetermined level by the reproducing amplifier 8, and this reproducing signal is equalized to a signal having a small intersymbol interference in the equalizer/data strobe 21 and, after being subjected to detection of the data strobe to be whether "1" or "0" and waveform shaping, output to the reproducing circuit together with a reproducing clock. The reproducing signal is subjected to demodulation of the PCM signal, error correction, etc. in the reproducing circuit 9, and thereafter, converted into an analog signal in the D/A converter 10 and output from an output 20. If it is to be output as a digital signal, the digital signal not passed through the D/A converter is output from a digital signal output terminal 23.

The reproducing circuit, at the time of reproduction, when the number of revolutions of the cylinder is set to be the same as that at the time of recording at double speed irrespective of the mode of operation at normal speed, double speed, or half speed, picks up the signal once in each two scans of the rotary head in the normal speed mode, in each scan thereof in the double speed mode, and in each four scans thereof in the half speed mode, based upon the signal generated by the timing generator circuit, and performs such processes as demodulation of the PCM signal and error correction.

The timing generator circuit 15 generates the timing signals for controlling various circuits, based on a reference clock provided by the oscillator circuit 16.

Denoted by 17 is an input terminal of a recording/reproduction switching signal and denoted by 18 is an input terminal of a later described speed switching signal for switching between normal speed, half speed, and double speed recording/reproduction.

Figure 2:
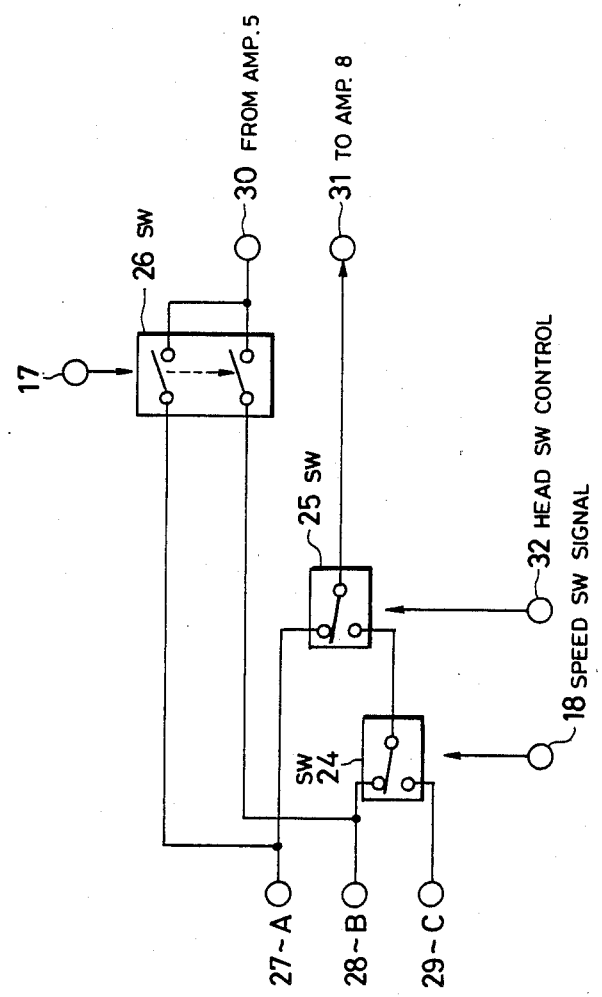
FIG. 2 is a block diagram of a head switching circuit in FIG. 1.

FIG. 2 is a block diagram of the head switching circuit in FIG. 1. The head switching circuit 4 consists of three switch circuits 24, 25, and 26. Terminal 27, 28, and 29 are connected with head A, head B, and head C, respectively. A terminal 30 is connected with the output terminal of the recording amplifier 5 and a terminal 31 is connected with the input of the reproducing amplifier 8. The switch circuit 24 is for selection of the (−) azimuth head (B or C) and, when the number of revolutions of the cylinder at the time of reproduction is set to be constant and the same as that at the time of recording at double speed, selects the head C at the time of reproduction at normal speed or half speed and selects head B at the time of reproduction at double speed.

That is, at the time of reproduction, in the case where the number of revolutions of the cylinder at the time of reproduction is set to be constant and the same as that at the time of recording at N-times normal speed, the head C is selected in the mode of operation at normal speed or 1/N-times normal speed where N is an even number and the head B is selected in the mode of operation at normal speed or 1/N-times normal speed where N is an odd number.

The switch circuit 25 is for switching between (+) azimuth head (head A) and the (−) azimuth head (head B or C) and actuated for switching by a head switching control signal input from an input terminal 32, and thereby, the reproducing signal from the head is output from the output terminal 31. The switch circuit 26 is for switching between recording and reproduction responding to a recording/reproduction switching signal from the terminal 17, and, at the time of recording, the switch circuit 26 is made and thereby the recording signal input from the input terminal 30 is output to head A and head B.

FIGS. 3A to 3F are operating timing charts at the time of recording at normal speed, when one track of recording is made through a half revolution of the cylinder.

Recording signal inputting (FIG. 3A) is performed for each two tracks, i.e., one cylinder revolution, as a unit. The signal group which is input for the n-th time is subjected to processing in the recording circuit 6 shown in FIG. 1 for attaching the synchronizing signal, error correcting signal, etc. thereto, for each track as a unit (na, nb), (FIG. 3B), during the period of the following one cylinder revolution. And, during the period of the next cylinder revolution, the outputs for the one-track units are delivered from the recording circuit (FIG. 3C) and recorded by the respective head A and head B (FIG. 3D, 3E). In synchronism with the above recording timing, the timing generator circuit 15 in FIG. 1 generates a cylinder reference signal (FIG. 3F). The cylinder reference signal is used in the cylinder servo circuit 12 for controlling the revolving phase of the cylinder motor 11 so that the timing of the head A coming into contact with the magnetic tape may coincide with the leading edge of this signal.

Now, the operations at the time of recording at double speed or half speed will be described. In the double-speed or half-speed recording mode, the feed speed of the magnetic tape is made double or half, the number of revolutions of the cylinder is made double or half, and the recording is performed at the rate of making record for one track in a half revolution of the cylinder, the same as in the case of recording at normal speed.

FIGS. 4A to 4F are operating timing charts at the time of recording at double speed, wherein the recording signal inputting (FIG. 4A), recording signal processing (FIGS. 4B, 4C), and recording timing at head A and head B (FIG. 4D, 4E) are the same as that in the recording mode at normal speed excepting that the processing speed is doubled now. For example, letting the number of revolutions of the cylinder at normal speed be 2000 rpm, one track is recorded in 15 ms at the normal speed, but one track is recorded in 7.5 ms at the double speed. The frequency of the cylinder servo reference signal (FIG. 4F) is also made twice as large as the frequency at the normal speed.

FIGS. 5A to 5F are operating timing charts at the time of recording at half speed, wherein the recording signal inputting (FIG. 5A), recording signal processing (FIGS. 5B, 5C), and recording timing at head A and head B (FIG. 5D, 5E) are the same as that in the recording mode at normal speed excepting that the processing speed is halved.

Figure 6:
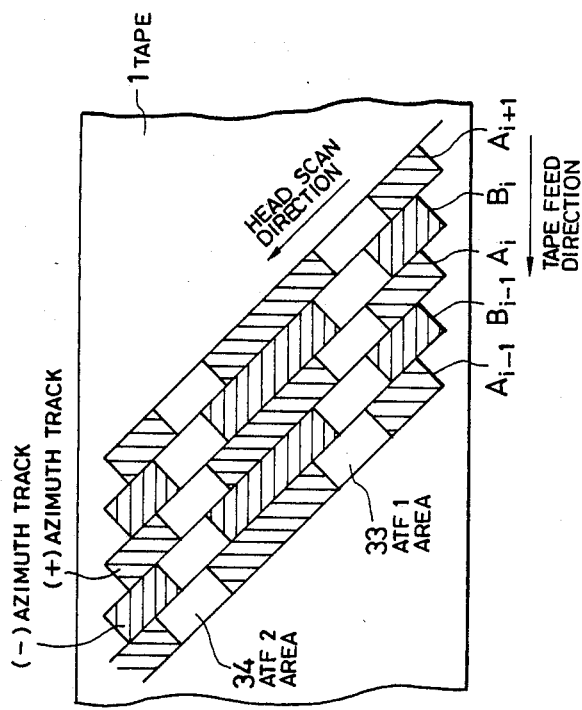
FIG. 6 is a drawing of a recording pattern on the magnetic tape at the time of operation at normal speed, double speed, and half speed.

FIG. 6 is a drawing showing the recording pattern on the magnetic tape in the modes at normal speed, double speed, and half speed. By virtue of the digital signal recording/reproducing apparatus according to the present invention, the recording pattern can be made constant irrespective of the mode at normal speed, double speed, or slow speed. The tracks are recorded by the head A and head B such that (+) azimuth tracks and (−) azimuth tracks are alternately arranged to constitute the guard band recording, in which each track is provided therein, as areas for recording the pilot signals for tracking control, with an ATF 1 area 33 at the inlet portion of the track in the head scan direction and with an ATF 2 area 34 at the outlet portion of the track in the head scan direction.

At the time of reproduction, the number of revolutions of the cylinder is kept constant at 4000 rpm, for example, irrespective of the mode of operation at normal speed, double speed, or half speed. As a result, the revolving speed of the rotary head at the time of reproduction at normal speed or half speed differs from that at the time of recording, and therefore, there arise such problems that the angle of track scanned by the head becomes different or that a single track is scanned by the head two times or more and the timing of picking up the reproducing signal becomes different.

Figure 7:
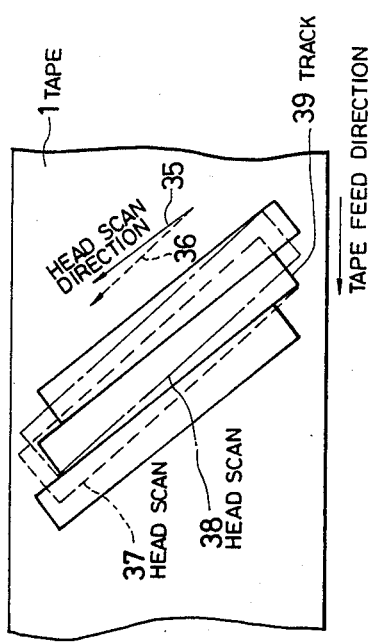
FIG. 7 is a drawing showing head scan loci at the time of reproduction at normal speed.

FIG. 7 is a drawing showing head scan loci at the time of reproduction at normal speed, in which the head scan direction 36 at the time of reproduction differs from the scan direction 35 at the time of recording and the number of revolutions of the head becomes two times that at the time of recording, and it follows that two times of head scans 37, 38 are applied to the whole length of a single track 39.

Figure 8:
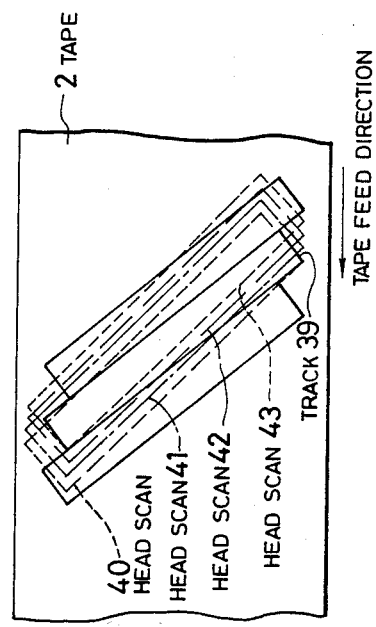
FIG. 8 is a drawing showing head scan loci at the time of reproduction at half speed.

FIG. 8 is a drawing showing head scan loci at the time of reproduction at half speed, in which the number of revolutions of the head becomes four times that at the time of recording, and it follows that four times of head scans 40-43 are applied to the whole length of a single track 39.

Below will be described most appropriate operating timing and tracking and method for tracking control at the time of operating modes at normal speed, double speed, and half speed.

FIGS. 9A-9G are operating timing charts at the time of reproduction at normal speed, in which case the picking up of the reproducing signal from the rotary head (FIG. 9C) is performed with the head A and head C alternately selected at intervals of two head scans. The switching between the head A and the head C is performed in the switch circuit 25 in FIG. 2 responding to the head switching control signal (FIG. 9F) generated by the timing generator circuit 15. The switch circuit 25 selects the side of head A when the head switching control signal is "1" and selects the side of head C when it is "0". The signal input to the reproducing circuit being an intermittent signal, this circuit performs the error correcting process during each of the periods when the signal is absent (FIG. 9D) and outputs the signals from the head A and head C during the time period of the following two revolutions (FIG. 9E). As to the cylinder control (FIG. 9G), the revolving speed and phase are controlled based upon the cylinder reference signal generated by the timing generator circuit 15, the same as in the recording mode.

Then, reproduction at double speed will be described.

FIGS. 10A-10G are operating timing charts at the time of reproduction at double speed. In the case of the reproduction at double speed, head A and head B are selected and the reproducing timing at the head A and B is the same as in the recording mode, only differing in that the timing of the signal processing (FIG. 10D) and reproducing signal outputting (FIG. 10E) in the reproducing circuit 9 are opposite to that in the recording mode. The pulse rate of the head switching control signal (FIG. 10F) is made double that in the normal speed mode corresponding to the picking up interval of the reproducing signal. The cylinder reference signal (FIG. 10G) is kept the same as in the normal speed mode.

Now, reproduction at half speed will be described.

FIGS. 11A-11G are operating timing charts at the time of reproduction at half speed, in which the picking up of the reproducing signal from the rotary head is performed with the head A and head C alternately selected at intervals of four head scans. The switching between the head A and the head C is performed in response to the head switching control signal (FIG. 11F), the same as in the mode of reproduction at normal speed. The pulse rate of the head switching control signal is made half that in the normal speed mode corresponding to the picking up interval of the reproducing signal.

By arranging the operating timing as described above, signal reproduction in each of the normal speed, double speed, and half speed modes can be achieved.

Now, the most appropriate method for tracking control in the normal speed, double speed, and half speed modes will be described in detail.

The capstan servo circuit, at the time of reproduction, controls the revolutions of the capstan motor 13, the same as in the recording operation, corresponding to the modes of operation at double speed and half speed so that the tape feed speed may be doubled or halved.

First, the tracking control at the time of reproduction at double speed will be described.

Figure 12:
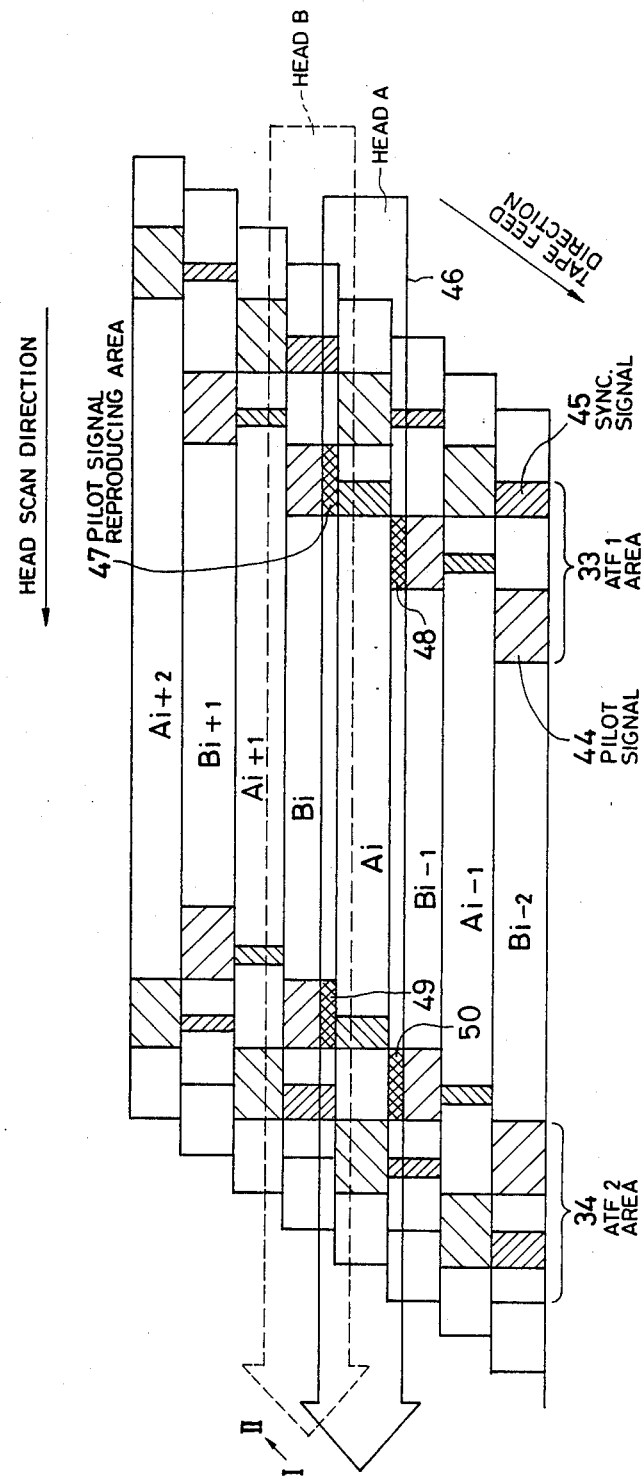
FIG. 12 is a drawing showing head scan loci at the time of reproduction at double speed and schematically describing the relative tracking control method.

FIG. 12 is a diagram showing head scan loci at the time of reproduction at double speed and schematically describing the relative method for tracking control, in which ATF1 area 33 and ATF2 area 34 dedicated for the tracking control are disposed at the inlet portion and the outlet portion of the track, and in each area, there are recorded a pilot signal 44 for generating a tracking error and a synchronizing signal 45 for detecting the position of the pilot signal 44 as shown in the figure.

The portion in the middle of the ATF1 area 33 and ATF2 are 34 is the PCM signal area and a portion on each side thereof is a subcode area. The purpose of the tracking control is to execute control such that the PCM portion in the middle that is desired to be read is tracked optimally.

At the time of reproduction at double speed, the number of revolutions of the rotary head agree with that at the time of recording, and therefore, the angle of the head scan locus 46 and the recording track angle coincide with each other. Hence, in the tracking control, the ATF control is performed, with a rotary head having a head width virtually 1.5 times as large as the track pitch and scanning the ATF1 area 33 and the ATF2 are 34, such that, in the ATF1 area 33, the difference between detected levels of the pilot signal reproducing area 47 on the adjoining track on one side and of the pilot signal reproducing area 48 on the adjoining track on the other side, and, in the ATF2 area 34, the difference between detected levels of the corresponding pilot signal reproducing areas 49 and 50, each may become zero. This control is applied to both the head A and the head B.

Next, the tracking control at the time of reproduction at normal speed will be described.

Figure 13:
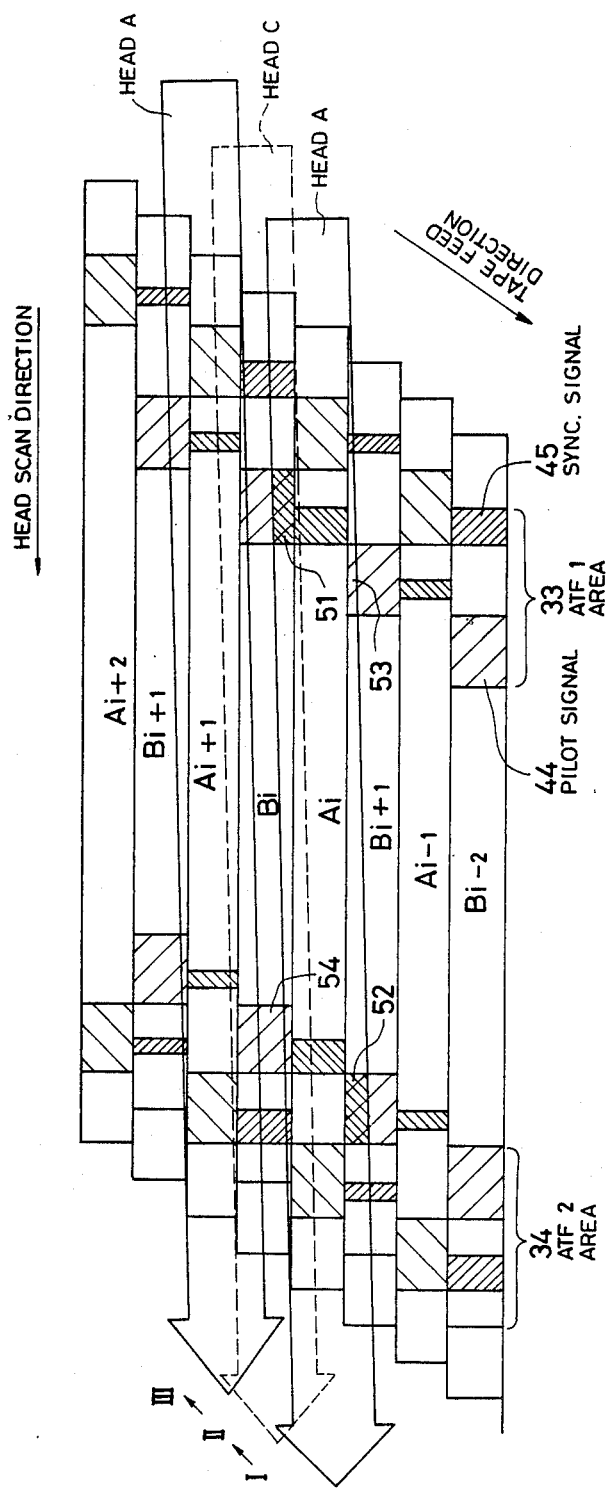
FIG. 13 is a drawing showing head scan loci at the time of reproduction at normal speed and schematically describing the relative tracking control method.

FIG. 13 is a diagram showing head scan loci at the time of reproduction at normal speed and schematically describing the relative method for tracking control. At the time of reproduction at normal speed, head A and head C are selected as described above with reference to FIG. 9, and when each head is scanning the recording track, the ATF control is performed such that the difference between detected levels of the pilot signal reproducing area 51 on the adjoining track on one side of the ATF1 area and of the pilot signal reproducing area 52 on the adjoining track on the other side of the ATF2 area, or the difference between detected levels of the corresponding area 53 of the ATF1 area and the corresponding area 54 of the ATF2 area, may become zero. This control is applied equally to both the head A and the head C.

Figure 14:
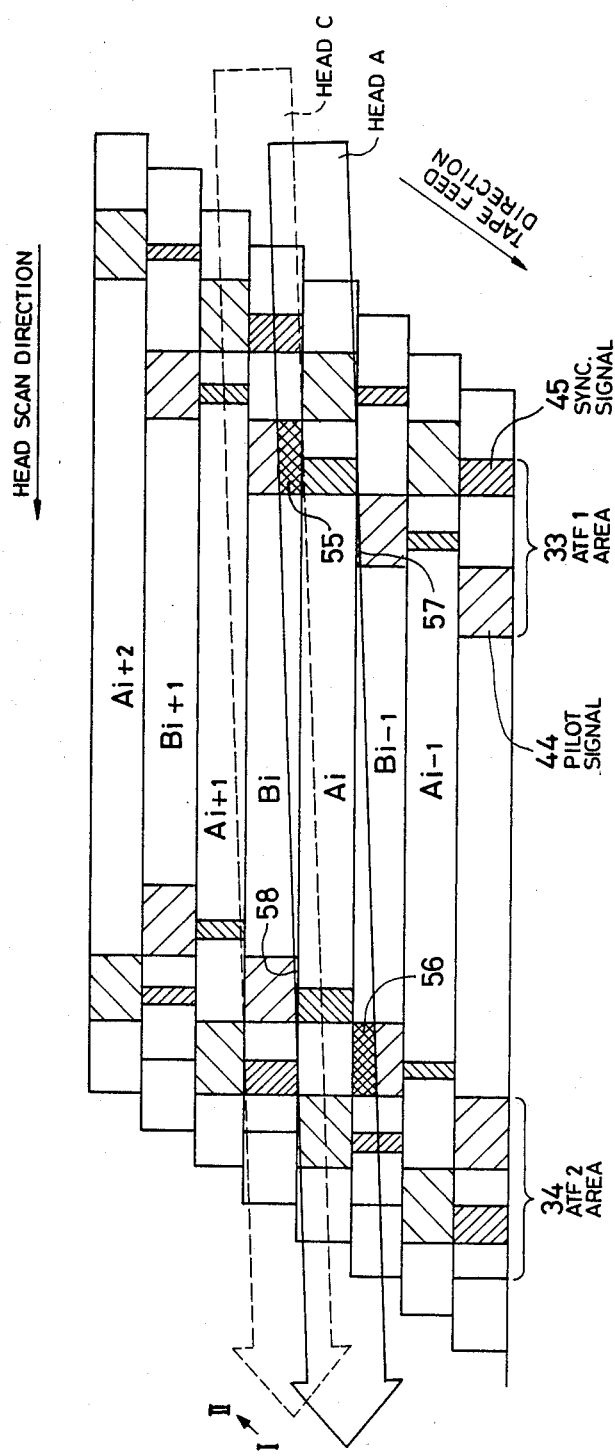
FIG. 14 is a drawing showing head scan loci at the time of reproduction at half speed and schematically describing the relative tracking control method.

FIG. 14 is a diagram showing head scan loci at the time of reproduction at half speed and schematically describing the relative method for tracking control. At the time of reproduction at half speed, head A and head C are selected as described above with reference to FIG. 11, and in the tracking control, the ATF control is performed the same as in the mode of reproduction at normal speed such that the difference between detected levels of the pilot signal reproducing area 55 in the ATF1 area and of the pilot signal reproducing area 56 in the ATF2 area, or the difference between detected levels of the corresponding area 57 in the ATF1 area and the corresponding area 58 in the ATF2 area, may become zero. This control is applied to both the head A and the head C.

Figure 15:
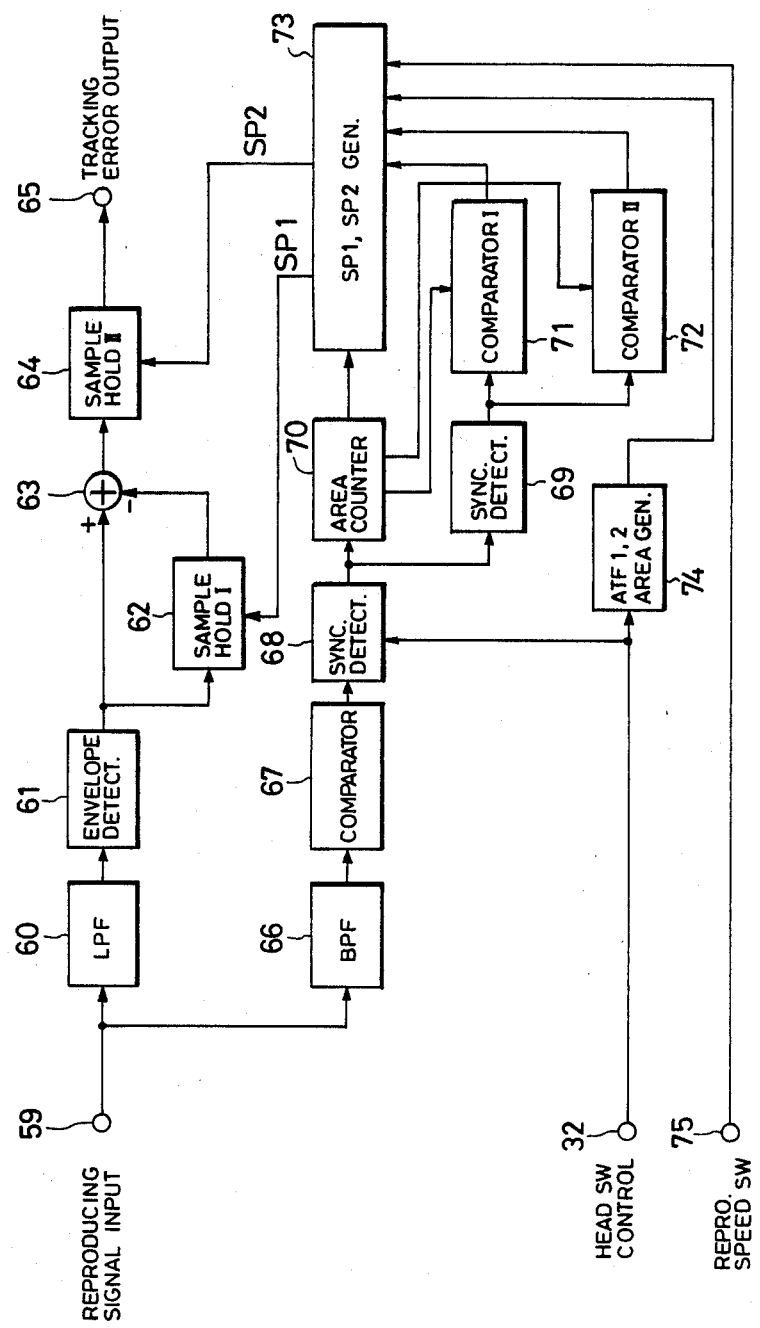
FIG. 15 is a block diagram showing an embodiment of an ATF control circuit of a capstan servo circuit.

FIG. 15 is a block diagram of an ATF control circuit of a capstan servo circuit performing the above described tracking control, in which the reproducing signal input 59 reproduced by the head is supplied to a low-pass filter (LPF) 60 and a pilot signal at lower frequency only is extracted therefrom, and from which is extracted its envelope by an envelope detector circuit 61. The crest voltage value of this envelope signal is held by a sample and hold I 62 at the timing of SP1.

Also, the output of the envelope detector circuit 61 and the output of the sample and hold I 62 are supplied to positive and negative inputs of a differential amplifier 63, respectively, whereby a voltage corresponding to the difference between both the signals is output from the differential amplifier 63. The voltage value of this signal is held in a sample and hold II 64 at the timing of SP2. Therefore, this voltage corresponds to the differential voltage at the timing of SP1 and SP2.

The timing of SP1 and SP2 allowing the voltage differential to be output as a tracking error output 65 is generated based upon the synchronizing signal located for detecting the position of the pilot signal. Detailed description of the generation of the timing will be given below.

The reproducing signal input is supplied to a bandpass filter (BPF), whereby the synchronizing signal is extracted therefrom, and then this signal is subjected to waveform shaping in a comparator 67 and converted into a square wave. This output of the comparator 67 is detected in a synchronizing signal detector circuit 68 as to whether it is the synchronizing signal or not, and thus detected synchronizing signal pattern is supplied to both a synchronizing signal counter 69 and an area counter 70.

The counted result by the synchronizing signal counter 69 is delivered to a comparator I 71 and a comparator II 72 to be compared therein with predetermined threshold values. The results of comparison are input to a SP1, SP2 generator circuit 73 according to timing signals delivered from the area counter 70, and thereby, the timing SP1 and SP2 are generated. As the threshold values, two successive synchronizing signals, for example, is used in the comparator I 71 and 50% in number of the synchronizing signals is used in the comparator II 72.

The generating timing of the signal SP1 is such that the same is generated at the head portion of the detected synchronizing signal area, i.e., virtually in the center of the pilot signal area recorded on the adjoining track. The generating timing of the signal SP2 is also such that the same is generated virtually in the center of the pilot signal area of the other adjoining track referenced from the synchronizing signal.

The SP1, SP2 generator circuit 73 is supplied with an area discriminating signal generated in an ATF1, 2 area generator circuit 74 in response to the head switching control signal 32 input thereto and a reproducing speed switching signal 75, and thereby performs switching control of the signals SP1, SP2 according to the reproduction modes at normal speed, double speed, and half speed.

FIGS. 16A, 16B, and 16C are output timing charts of the signals SP1, SP2 corresponding to the head-reproduced outputs at the time of reproduction at normal speed, double speed, and half speed, respectively.

In the reproducing mode at normal speed as shown in FIG. 16A, the signal SP1 is output to the portion of the ATF1 (or ATF2) of both the reproduced envelopes by head A and head C and the signal SP2 is output to the portion of the ATF2 (or ATF1), whereby levels of the pilot signal reproducing areas 51 and 52 (or 53 and 54) as indicated in FIG. 13 are detected.

In the reproducing mode at double speed, both the signals SP1 and SP2 are generated at each of the ATF1 and ATF2 areas for both the head A and the head B, whereby the pilot signals on both adjoining tracks at each area are detected.

In the reproducing mode at half speed, the timing is similar to that in the reproducing mode at normal speed.

By the tracking controlling method as described above, the tracking control circuit enabled to provide optimal reproducing outputs at the time of reproduction at normal speed, double speed, and half speed has been realized.

In the above described embodiment of the present invention, the case of recording and reproduction at double speed and at half speed were mentioned, but by setting the recording and reproducing timing shown in FIG. 5 and FIG. 11 to be "normal", recording and reproduction at two times normal speed can be attained by the recording and reproducing timing as shown in FIG. 3 and FIG. 9 and recording and reproduction at four-times normal speed can be attained by the timing as shown in FIG. 4 and FIG. 10.

Likewise, by setting the recording and reproducing timing shown in FIG. 4 and FIG. 10 to be "normal", recording and reproduction at half speed can be attained by the timing as shown in FIG. 3 and FIG. 9 and recording and reproduction at one-fourth speed can be attained by the recording and reproducing timing as shown in FIG. 5 and FIG. 11.

What is claimed is:

1. An apparatus for recording/reproducing a digital signal on and from a magnetic tape at variable speeds including a normal speed, the apparatus comprising a rotary head including a cylinder having at least two magnetic heads means provided thereon, tracking control means including an automatic track finding circuit for effecting tracking control at the time of reproduction in accordance with tracking signals recorded for each track in a predetermined pattern and at predetermined positions on the magnetic tape and for generating a tracking error signal detected for each track, a revolution speed of a capstan for feeding the magnetic tape being controlled in accordance therewith, feed speed control means for controlling the feed speed of the magnetic tape to be one of N-times normal speed and 1/N-times normal speed at the time of recording/reproduction at one of N-times normal speed and 1/N-times normal speed, where N is an integer greater than one, cylinder control circuit means for controlling the speed of revolution of the cylinder of the rotary head to be one of N-times normal speed and 1/N-times normal speed at the time of recording at one of N-times normal speed and 1/N-times normal speed and for controlling the speed of revolution of the cylinder to be a constant speed at the time of reproduction independently of the operation speed at reproduction, and timing generator circuit means for controlling a processing speed of a recording signal to be one of N-times normal speed and 1/N-times normal speed at the time of recording at one of N-times normal speed and 1/N-times normal speed and for controlling the processing speed of a reproducing signal to be a constant at the time of reproduction independently of the operation speed at reproduction.

2. An apparatus according to claim 1, wherein the rotary head includes the cylinder having first, second and third head means provided thereon, the first and third head means being formed as one of separate heads disposed so as to adjoin each other and having azimuth angles different from each other, and a single head having two gaps with azimuth angles different from each other, the second head means being provided on the cylinder at a position opposite the first and third head means at an angle substantially 180° with respect thereto, the second head means having the same azimuth angle as that of the third head means, and one of the first and third head means and the second head means being alternately utilized for at least one of recording and reproduction.

3. An apparatus according to claim 1, wherein the cylinder control circuit means sets the speed of revolution of the cylinder at the time of reproduction to be the same as that at the time of recording at N-times normal speed, and the timing generator circuit means controls the picking up of a reproducing signal so that at the time of reproduction at normal speed, the picking up of the reproducing signal is effected once each N-times of scanning the tracks on the magnetic tape and for effecting the picking up of the reproducing signal at the time of reproduction at 1/N-times normal speed once each $N^2$ times of scanning of the tracks, the tracking control means at the time of reproduction at normal speed and at 1/N-times normal speed detecting at a first tracking control signal record area disposed at an inlet portion of a track in the scan direction of the head means a pilot signal disposed on an adjoining track at one side of the track for enabling generation of a tracking error signal, and detecting at a second tracking control signal record area disposed on an outlet portion of the track in the scanning direction of the head means a pilot signal disposed on an adjoining track on the other side of the track, the tracking control means, at the time of reproduction at N-times normal speed detecting at each of the first and second tracking control signal record areas pilot signals disposed on both of the adjoining tracks, the feed speed control circuit means being responsive to the tracking error signal generated by the tracking control means for controlling the revolution speed of the capstan so as to enable the difference in levels of the detected pilot signals to become zero.

* * * * *